(12) United States Patent
Gordeev et al.

(10) Patent No.: US 8,502,158 B1
(45) Date of Patent: Aug. 6, 2013

(54) DISTRIBUTED SYSTEM FOR RADIATION DETECTION UTILIZING MULTIPLE CLUSTERED DETECTORS

(75) Inventors: Alexander N. Gordeev, Minsk (BY); Liudmila A. Antonauskaya, Minsk (BY)

(73) Assignee: Polimaster IP Solutions LLC, Arlington, VA (US)

( * ) Notice: Subject to any disclaimer, the term of this patent is extended or adjusted under 35 U.S.C. 154(b) by 791 days.

(21) Appl. No.: 12/756,022

(22) Filed: Apr. 7, 2010

(51) Int. Cl.
*G01T 1/00* (2006.01)

(52) U.S. Cl.
USPC ............................ 250/394; 250/395; 340/600

(58) Field of Classification Search
USPC ........... 250/336.1, 394, 395; 340/600; 702/49
See application file for complete search history.

(56) References Cited

U.S. PATENT DOCUMENTS

| | | | | |
|---|---|---|---|---|
| 7,351,982 B2 * | 4/2008 | Hofstetter et al. | ....... | 250/390.01 |
| 7,545,269 B2 * | 6/2009 | Craig et al. | ............. | 340/539.26 |
| 7,960,700 B2 * | 6/2011 | Craig et al. | ............. | 250/370.01 |
| 7,994,926 B2 * | 8/2011 | Longman et al. | ............. | 340/600 |
| 8,390,474 B2 * | 3/2013 | Yi et al. | .................... | 340/870.02 |
| 2004/0149918 A1 * | 8/2004 | Craig et al. | ............. | 250/370.01 |
| 2006/0266948 A1 * | 11/2006 | Hofstetter et al. | ....... | 250/370.01 |
| 2007/0018806 A1 * | 1/2007 | Craig et al. | ................... | 340/500 |
| 2007/0018807 A1 * | 1/2007 | Craig et al. | ................... | 340/500 |
| 2007/0044539 A1 * | 3/2007 | Sabol et al. | ................... | 73/19.01 |
| 2007/0222585 A1 * | 9/2007 | Sabol et al. | ............. | 340/539.11 |
| 2009/0012745 A1 * | 1/2009 | Longman et al. | ............. | 702/179 |

* cited by examiner

*Primary Examiner* — Mark R Gaworecki
(74) *Attorney, Agent, or Firm* — Bardmesser Law Group

(57) ABSTRACT

A detection unit for detecting ionizing radiation including a crystal that interacts with incoming radiation; a processing module that analyzes the incoming radiation detected by the crystal; a positioning module that determines position of the detection unit; and a network interface module that receives and transmits time stamped radiation data and position information from/to a plurality of other detection units. The detection unit automatically identifies other detection units that are located close to form a cluster. The detection unit also includes radiation data integration logic that integrates the incoming radiation data from all detectors in cluster, the position of the detection unit, the received radiation data from other detection units and the received position information from other detection units in real time, and process it simultaneously, that allows significantly improve performance and reliability.

18 Claims, 5 Drawing Sheets

Distributed System

DISTRIBUTED SYSTEM FOR RADIATION DETECTION UTILIZING MULTIPLE CLUSTERED DETECTORS

BACKGROUND OF THE INVENTION

1. Field of the Invention

The invention is related to detection of ionizing radiation (alpha, beta, gamma and neutron), chemicals, and other environmental threats, and more particularly, to a distributed system using multiple detectors arranged into self-organizing clusters, and connected using wired and wireless networks.

2. Description of the Related Art

There are a number of possible threats that law enforcement agencies need to be concerned about. These include threats from radioactive and nuclear materials, chemicals (whether released deliberately or accidentally into the environment, particularly into the atmosphere, including both industrial chemical releases and weaponized chemical releases), biological and bacteriological threats, and so forth. The general trend in such detection systems has been in reducing size and weight of individual detectors, and in making them generally more mobile and less expensive. However, a number of issues remain that need to be addressed in the field of radiation and chemical environmental threat detection. One of the problems, particularly in the field of radiation detection, is impracticality of reducing the size of the device below a certain form factor as this decreases sensitivity and hence effectiveness of detection. As one example, radiation detectors use a scintillation crystal or scintillation method to detect radiation. Scintillation method uses a crystal and a photo detector adjacent to the crystal, where events due to radiation interacting with the crystal are detected. The events are then processed, typically by some sort of a CPU, to generate an alarm and identify the nature of the detected radiation.

A practical reality of such radiation detectors is that the size of the interacting element (scintillation crystal, semiconductor, Geiger-Muller counter, ionization chamber, etc.) used to register the radiation event cannot be made much smaller than a certain size without creating difficulties in distinguishing background radiation from actual events. It should also be remembered that detection of radiation using a scintillation crystal (for example) is generally a probabilistic process—some number of events are detected per unit time, and a probabilistic model is used to filter out "real" events (signal) from background radiation (noise) and radiation from natural isotopes (false positives). Special algorithms must be used in the processing logic and software to filter out the false detection events.

However, when making the scintillation crystal smaller and smaller, it becomes more and more difficult to separate the false positive events (e.g. events caused by medical or naturally occurring isotopes) and background radiation from events caused by actual radiation and nuclear sources. This is generally the reason why a compromise must be found between sensitivity and accuracy of detection on the one hand, and device size and miniaturization concerns on the other. Although various methods for using statistical algorithms to "tease out" more data from smaller crystals (and smaller detection elements generally) are known, there are practical physical limits beyond which is it is impossible to improve sensitivity of the individual detectors by improving the data processing algorithms. These limits are based, at least in part, on the amount of data that is collected for statistical processing, below a certain threshold, more data will need to be collected per unit time, in order to provide sufficient data for the statistical analysis.

Another problem in the field of radiation detection is the difficulty in establishing directionality of the source of the signal by small mobile instruments—typically, personal radiation detectors (PRDs) do not have a mechanism for determining direction to the source of the radiation, and/or triangulation of the source, etc. Therefore, for a typical user, it is necessary to walk around with the detection device, looking for localized signal maxima. This process can be generally time consuming, often expensive and cumbersome. Also, it is desirable to avoid having to train users in the use of radiation detection devices.

Accordingly, there is a need in the art for a system and method that addresses the above problems.

SUMMARY OF THE INVENTION

Accordingly, the present invention is related to a distributed system of detection of ionizing radiation, chemicals and other environmental hazards utilizing multiple detectors that substantially obviates one or more of the disadvantages of the related art.

In one aspect, there is provided a detection unit for detecting radiation, the detection unit including a crystal (or another detecting element for detecting ionizing radiation, such as GM counter, ionizing chamber, semiconductor detector, etc.) that interacts with incoming radiation; a processing module that analyzes the incoming signals that correspond to received radiation that is detected by the crystal (and optionally data from other detection units); an optional positioning module that determines position of the detection unit in three dimensions (or, alternatively, position of the device in 3D can be received from a network through a network interface); and a network interface module that receives radiation data and position information from a plurality of other detection units. The detection unit automatically identifies other detection units that are located sufficiently close to form a cluster. The detection unit also optionally includes radiation data integration logic that integrates the incoming radiation data from all detectors in cluster, the position of the detection unit, the received radiation data from other detection units and the received position information from other detection units, and outputs an integrated three-dimensional radiation map including direction to the sources based on the incoming radiation data, the position of the detection unit, the received radiation data from other detection units and the received position information from other detection units; and a display unit that displays the integrated three-dimensional radiation map, including direction to the source, and its parameters, such as type of isotope, activity, etc. The network interface module can transmit the radiation data and its own position information to other detection units of the clusters to which the detection unit belongs Optionally, the detection unit may include positioning module that includes a Global Positioning System (GPS) (or similar). The display unit can provide triangulation or location information for identifying location of a source of radiation, as well as other parameters, such as speed and/or direction of movement, type of the isotope, its activity, etc. The crystal can be, for example, a Cesium Iodine crystal CsI(Tl), Sodium Iodine NaI(Tl) or a Lithium crystal $^6$LiI(Eu) typically used in radiation detection. The module uses, for example, wireless Wi-Fi, Wi-Max, AXCO Project 25, UWD and UMTS protocols, wired Ethernet or similar, as well as (or other appropriate protocols) to establish communication with other detection units. The ionizing radiation includes any of alpha, beta, gamma, neutron, or X-ray radiation or any combination of the above. Radiation data from other detection units in the cluster includes data from similar or different types of detectors than the detector of the detection unit that is processed simultaneously in the detection unit. The network module may also be used as re-transmitter to retransmit radiation data and positioning data from other detection units to at least some of the neighboring the detection units. Note that each detection unit can process radiation data that it detects independently of the other detection units. Also, each detection unit can be part of a single cluster or part of multiple clusters.

In another aspect, there is provided a system for detecting ionizing radiation, the system including a plurality of detection units grouped into clusters, each detection unit including a crystal (or another detecting element for detecting ionizing radiation, such as GM counter, ionizing chamber, semiconductor, etc.) that interacts with incoming radiation, a processing module that analyzes the incoming radiation detected by the crystal, a positioning module that determines position of the detection unit in three dimensions, and a network interface module that receives radiation data and position information from a plurality of other detection units in cluster. The clusters can be re-formed dynamically as the detection units move in space, in real time. The detection units automatically identify other detection units that are located sufficiently close to form a cluster. Each detection unit including radiation data integration logic that integrates the incoming radiation data, in real time, the position of the detection unit, the received radiation data from other detection units of the cluster and the received position information from other detection units, and outputs an integrated three-dimensional radiation map based on the incoming radiation data, the position of the detection unit, the received radiation data from other detection units and the received position information from other detection units. At least some of the detection units including a display unit that displays the integrated three-dimensional radiation map.

As such, the distributed detection system includes a plurality of detection units organized into cluster(s). The clusters can self-form, and can re-form dynamically and continuously as the individual detection units move in space. Each detection unit can process data from multiple other detection units in its cluster. The distributed detection system can have a (i) reach back system, (ii) a positioning module by using radiolocation signals from the network modules of detection units, and, optionally (iii) a centralized module for information display, e.g., in the form of a 3D map.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 1:
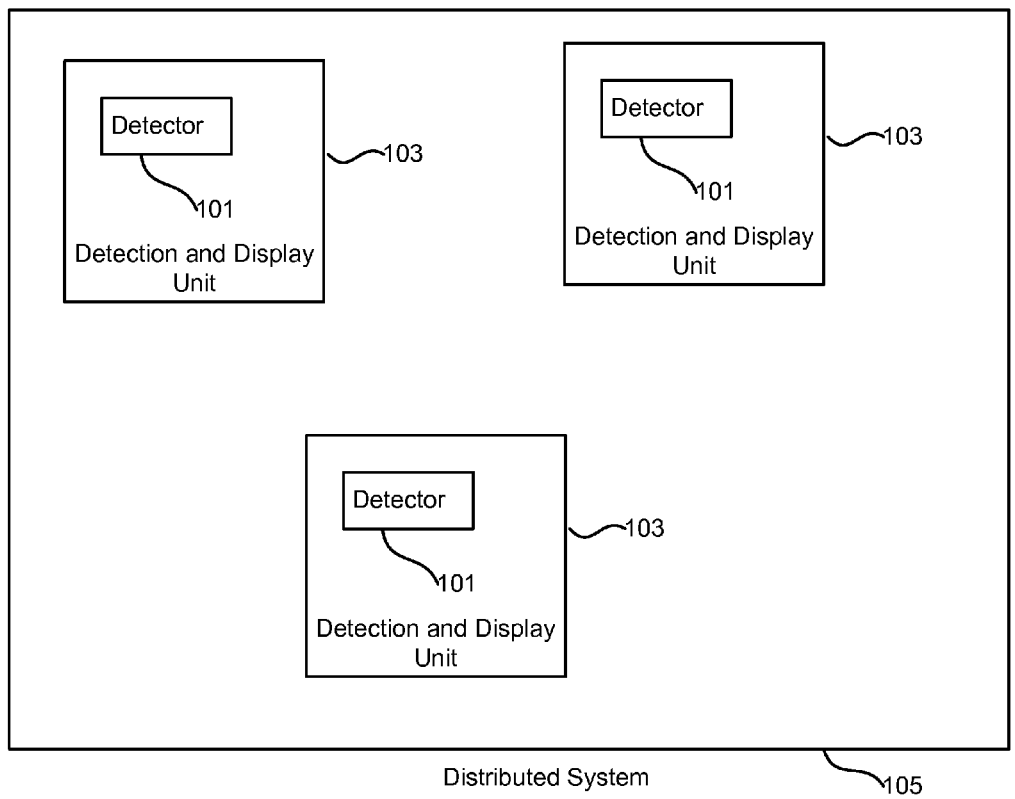
FIG. 1 shows an exemplary design of the radiation detection unit.

The images in the drawings are simplified for illustrative purposes and are not depicted to scale. To facilitate understanding, identical reference numerals have been used, where possible, to designate identical elements that are common to the figures, except that suffixes may be added, when appropriate, to differentiate such elements.

DETAILED DESCRIPTION OF THE PREFERRED EMBODIMENTS

Reference will now be made in detail to the embodiments of the present invention, examples of which are illustrated in the accompanying drawings.

The present invention is therefore directed to the use of a distributed system of multiple detectors that is designed to act as a single integrated whole for purposes of detection of ionizing radiation, chemical, and other threats. The system and method described herein contemplate the use of multiple detection devices that are connected via a network into clusters of detectors. Each detection device individually can be a relatively simple device, for example, using a fairly small (1 cubic centimeter, for example, or even smaller) scintillation crystal. Each detection device can establish communication with neighboring devices, forming a cluster (i.e., a set of devices that transmit data to a selected device, and the received data is processed collectively in real time). Each detection device can communicate with its neighbors regarding the radiation or chemical event that it detects. In this case, when each detection device computes the raw radiation data, and/or count rate per interval of time, and/or radiation spectrum, it can use not only its own data, but also the data from other detection devices in the cluster. As such, the detection device has enough data for processing algorithms similar to a detection device with a detector size that is much larger than the size of any individual crystal in any particular detection device. From a statistical perspective, the effectiveness of the algorithm for detecting radiation events and spectrum analysis depends on the number of data points (events) received and processed by the detection unit—thus, by increasing a total number of detection units involved, the number of events that can be processed by a statistical algorithm correspondingly increases. Therefore, the sensitivity and accuracy of the overall system is considerably greater than the sensitivity of the individual detection device. The detection devices can communicate with each other using any number of known wireless protocols (such as Bluetooth, Wi-Fi, Wi-max, and so on) or wired protocols (Ethernet, etc.). In some circumstances, some or all of the detection devices can be connected through the Internet or other networks.

Furthermore, each detection device is provided with a mechanism for determining its own position, such as global position system (GPS or similar) or can be part of an RF range finding and location system. The devices in the cluster communicate with each other regarding both the radiation events that they detect and process and their own position, enabling each device to build up a combined statistical picture, and relationship of the individual spectra and/or radiation events detected by each detection device to each other, as well as a 3-dimensional map or 2-dimensional map of other devices in its cluster and the data from those devices, and/or direction and distance to the source of radiation and/or location and/or movement of the source of radiation in 2 or 3 coordinates.

Each device can optionally be capable of retransmitting information from other devices in its cluster (and retransmitting from re-transmitters). This can be particularly useful if a relatively short range communication protocol, such as Zig-Bee (IEEE 802.15) is used. The user can define, for each device, how far (in space) he is interested in seeing the 3-dimensional radiation map (assuming the size and resolution of the display of his detection unit supports such a display mode), as well as optionally the desired cluster size.

As yet another option, the detection device itself can be a fairly complex one, for example, such as a PDA or a SmartPhone with a detector attached to it—in other words, a device that has both sophisticated processing and display capability. As another option, the detection device can be fairly simple, essentially consisting of the ionizing radiation detection element (scintillation crystal, semiconductor, etc.) or chemical detector, the event detection logic, and the network interface unit for receiving and transmitting the data to/from other devices and/or to some central data repository (e.g., a computer that collects data from multiple detection units in a given area and process data from every cluster in real time, and displays information to a user, or transmits it further to a higher hierarchical level for analysis. Such a simple device might not have the display capability, and might not have the capability to identify spectra received from other detection units, but is only able to connect to another devices and transmit the spectrum (or just events) that itself has detected and receive similar events (spectrum) from those devices in cluster. Other detection devices, having more processing power and more display capability, will use the information from the network of relatively simple detection devices.

Also, such simple devices can be left in various places, attached to walls, carried in pockets of a large number of people, etc. The more advanced processing capability can remain with the more complex versions of the detection devices contemplated herein. The network contemplated herein therefore can be a combination of devices of varying complexity—from the simplest ones having little more than a crystal, some processing logic and wireless or wired communication capability, to more complex ones that has advanced processing logic and integrate information from multiple devices and display the information to a user in multiple formats. If no other devices are within range of a particular device (or are not transmitting data to it), then the detection device can rely only on data that it itself collects.

Additionally, it should be noted that many portable devices today have far more CPU processing power than is necessary for their functionality. For example, many GPS positioning units utilize only a fraction of their CPU capability most of the time. Also, many SmartPhones and PDAs today have more processing power in their CPUs than they need. Therefore, it is not expected that the computational burden on the detection devices is insurmountable.

Thus, the distributed detection system contemplated herein typically contains a number of detection units (of the same type or mixed), with the detection units organized into at least one (and often more than one) cluster. The clusters are formed dynamically, and each detection unit is the "center" of its cluster. The distributed detection system can also have an RTK transmitter and/or RF location system, one or multiple servers, connections to the servers either through local wireless connections, through wired connections, through the Internet, etc.

Additionally, the distributed detection system contemplated herein can reduce false alarms (e.g., the detection unit reports an event that happens to be due to a medical isotope, sometimes known as "innocent alarm") or false alarm (when the device anomalously reports an event when no event actually took place). For example, if there are several devices that are physically located at the moment close to each other, and one (but only one) of the detection devices shows a presence of radiation source (alarm)—but none of the other detection devices detect such a radiation source, then an algorithm for discriminating against false positive events can conclude that in this case, it is probably the detection device that is malfunctioning (or, in any event, reading a false positive), rather than an actual detection of radioactive material.

Additionally, the system described herein can help locate (in some cases, triangulate) the radiation sources and chemical sources. An operator with a detection device that has display capability can display direction to the radiation source and a 3-dimensional map showing the locations of the other detection devices in the cluster and sources of ionizing radiation, as well as intensity of the ionizing radiation at different distances from the source distributed in 3-D space. Such a 3-dimensional map can help easily visualize and locate the source of the radiation. Also, the 3-dimensional map that is displayed to the operator can be a map of the location of the devices, a map of the detected radiation based on analysis of data received from other detection units in the cluster, and using different algorithms (e.g., triangulation, spectrum analysis, etc.) an integrated map together with features of the geographic terrain (for example, integrated into Google maps, MapQuest, or similar), or some combination. The operator can optionally select which mode of display he prefers.

FIG. 1 illustrates a distributed detection system 105 that typically includes multiple detection and display units 103. Each unit 103 essentially includes three components: a detector 101 that includes the actual physical elements required to detect the radiation or chemical components—for example, a scintillation crystal, processing logic, and so forth. The detection and display unit 103 is typically a roughly palm-sized or handheld device (for example, the size of a cigarette pack or similar, or the size of a GPS/network tracker, a USB flash drive, integrated into a laptop, a netbook, a cell phone or PDA or similar), an attachment to a cellphone, such as an IPHONE (and usually includes a display unit), a network interface unit (wired or wireless), and so forth. The system 105 contemplates the use of multiple detection units that arrange themselves into a cluster. For example, each detection unit can detect all devices within a sphere of a radius R, and all devices within the sphere form a cluster (the user or operator can set the value of R, or the value of R can be preset during manufacture or calibration). Also, R can depend on the number of detection units in the system 105, use conditions, area to be covered, and size of detection element in the individual detection units. R can be the same for all detection units in the system, or can be defined individually for each one.

In a sense, the clusters are overlapping spheres, in the centers of which are detection units. Such a cluster, as noted earlier, can include devices of varying complexity—from the simplest ones even without a display unit and which are intended to be stationary, to the more complex ones, including the most sophisticated display and mapping capability, as well as optionally a mechanism for communication to other networks, for example, communication to a server that aggregates information from a large number of such distributed clusterized systems and devices, ranging from a local scale, up to multiple city block scale, to citywide scale, to statewide scale, to national scale.

Figure 5:
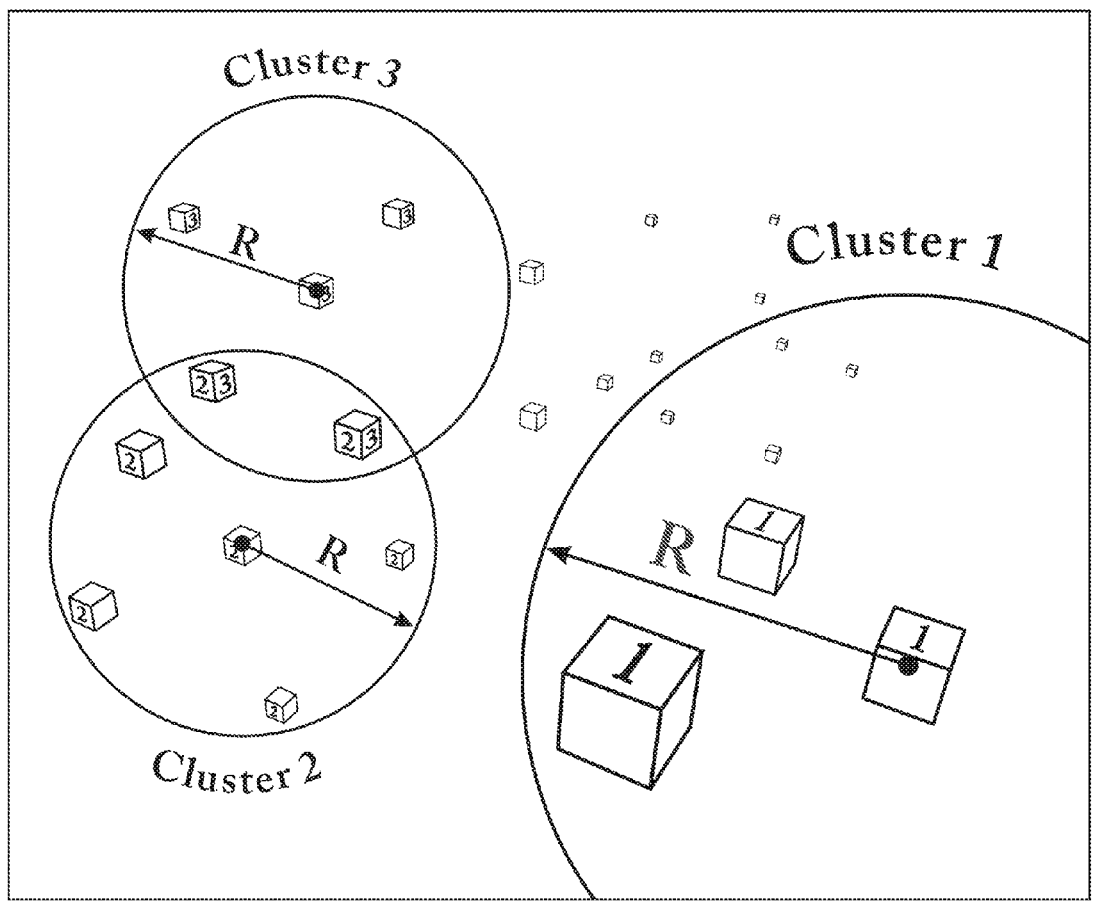
FIG. 5 shows an example of cluster organization.

Note also that the clusters can be continuously reconfigured, as the devices move in space (and it is expected to the be the normal mode of operation—on the other hand, if at any point in time, a detection unit is not receiving data from any other detection unit, it can act autonomously). Each detection unit forms a cluster automatically, as long as there is another detection unit within a distance R of itself, see example shown in FIG. 5, with three clusters. From the moment the cluster is formed, the detection unit that formed the cluster starts synchronously processing the data from other detection units of its cluster. The detection unit can continuously identify those units that are no further than R from it, and use those units' data for its calculations. The cluster is thus dynamic—various detection devices can be periodically (e.g., once a second) added or removed from it as they move or the unit itself moves. Alternatively, the detection units can form a cluster only once an event has been detected, otherwise, they remain quiescent (in order to conserve battery life). This is typically because there is no point in processing data from far away on each individual device, since the intensity of the radiation falls as the square of the distance (and, for chemical detectors, depending on diffusion, temperature, chemical type, etc.).=

Also, note that such a device can be located on a person, on vehicles, on helicopters, aircraft, buses, trains, and so forth. One of the advantages of the approach described herein is that the reliability of the overall system is substantially greater than the reliability of any one individual detection device as well as networked radiation controlled systems with selected central server. The failure of any one detection device (or even any number of detection devices) does not substantially affect the reliability and effectiveness of the overall system. Only in case of failure of most of the devices, where the remaining devices do not have sufficient data collected from still functioning devices, will be a performance of the system be affected. But even in this case, it will not be worse then performance of the system with centralized server and/or any single detection device.

Also, many of the detection devices can be manufactured relatively cheaply, since, depending on system configuration and intended use, many of the detection devices do not need the full display and processing capability. Thus, it is expected that the simplest such detection device can cost on the order of a $50-200 (in 2009).

Various protocols can be used for inter-device communication, such as ZigBee, Wi-Fi, Wi-Max, AXCO Project 25, UWD, UMTS, etc. Note also that each detection device can contain either a single detector, or multiple detectors (for example, a detection device can include gamma and neutron radiation detectors, as well as industrial chemical detector, as well as CWA (chemical warfare agents) gas detectors—or can contain only one or some of these. Similarly, the "simple version" detection devices can contain all or some or just one of these detectors.

Additionally, it is contemplated that, if a GPS (or GLONASS or GALILEO, or similar) positioning is used, a local GPS base station (RTK transmitter) can be utilized, to improve accuracy. In that case, the positioning accuracy of each device can be less than a few centimeters, that will improve location capabilities of the system, and performance of triangulation algorithms.

Figure 2:
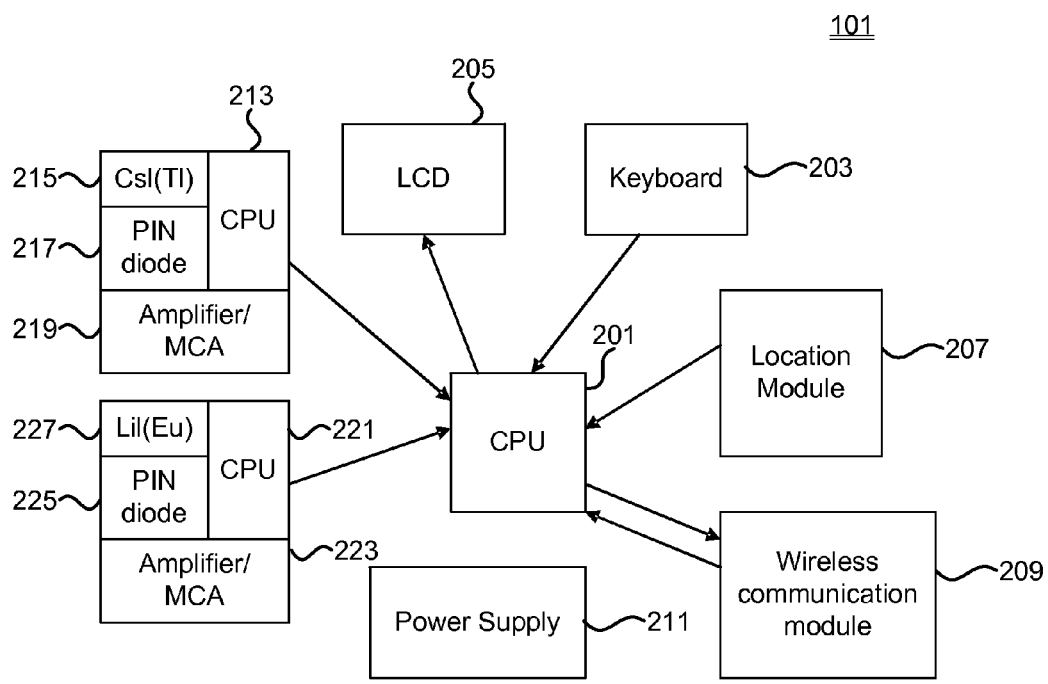
FIG. 2 shows a high-level block diagram of a radiation detection unit according to one embodiment of the present invention.

FIG. 2 illustrates a typical detection device 101. As shown in FIG. 2, the detection device includes a simple processing unit 201, a power supply 211, a location module 207 (GPS or RF location), a wireless communication module 209, a display, such as, for example, an LCD 205, and a keyboard 203. It is contemplated that any of the user interface form factors, such as touch screen displays, button-based keyboards, etc. can be used.

The detection device 101 also includes, for example, a Cesium Iodine crystal 215, a CPU 213 for processing of the spectrum, a PIN diode 217, and an amplifier 219. The detection device 101 can also include a lithium iodine crystal 227, another PIN diode 225, a CPU 221, and an amplifier 223. Note also that instead of separate CPUs 213, 221, the CPU 201 can be used for all the processing.

Figure 3:
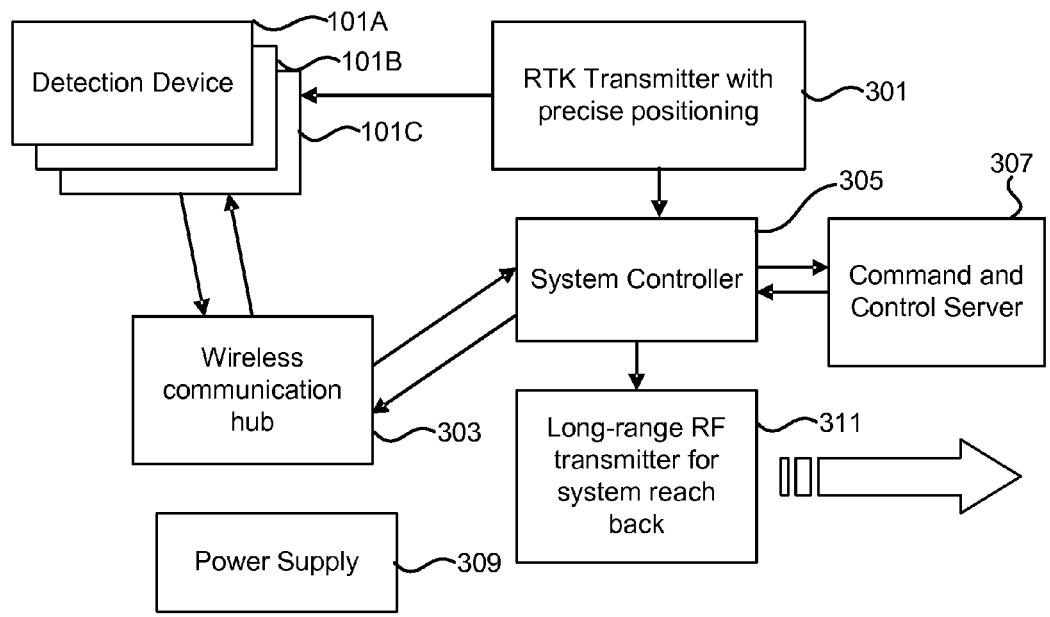
FIG. 3 shows a high-level schematic diagram of an exemplary system utilizing the radiation detection units of FIG. 2.

FIG. 3 illustrates the overall distributed system. As shown in FIG. 3, the system includes multiple detection devices 101A, 101B, 101C . . . . Positioning information is received from a RTK transmitter 301. A command a command and control server (which can be located relatively locally, or can be connected over the internet or similar) is connected to a system controller 305, which manages the RTK transmitter, the network connections, the devices themselves (optionally), etc., assuming there is a control center. A wireless communication hub 303 can be used as a local re-transmitter of data between the detection devices, or, as an alternative, each device can reconfigure itself to communicate with neighboring devices (i.e., those that are within reach of its communication module 209).

Each detection device 101 can identify other detection units within a certain range of itself, in 3-dimensional space, and starts receiving radiation data (such as count rate, spectrum data raw data from detector) from other detection units in its cluster in real time, and transmitting its own position and detected radiation events (count rate and/or, spectrum and/or raw data) to each or some of the detection units of the cluster to which it belongs. The data can include event count, event type, spectrum per unit time, current location, etc. Also, each detection unit can optionally receive data from other units with which it is in contact. Typically, processing would be done in real time, in other words, at time t, data received from all the devices in the cluster during the period (t−1, t) is processed, with the assumption that the data is substantially synchronized and/or optionally time stamped.

Thus, if a detection device is connected to 20 or 30 neighboring devices, and the neighboring devices are relatively close, and each has a 1 cubic centimeter crystal, this results in a hypothetical (synthetic) detection device with, effectively, a crystal having a volume of 20 cubic centimeters. Also, the exchange of data can be not only directly between detection units, but through a server or similar mechanism (particularly for those detection units that might only have a connection to a server, but not directly to another detection unit). The server can also aggregate data from multiple clusters, or from some of the devices in some of the clusters, or from all the devices in all the clusters it is in contact with.

However, it should also be remembered that since the detection devices are distributed in space, the effectiveness of the cluster grows not linearly, but much faster—in other words, due to the distribution of the detection elements throughout space, the effective detector has not a 20 cubic centimeter crystal, but more like 50 or 100 cubic centimeters (which would be an extremely large detector if it were built as a single unit)—and the more detectors are part of the cluster, the greater the synergetic effect. Also, the effect is achieved with very low cost detectors.

As noted earlier, the detection units can provide either raw data or processed data to other detection units. Given a point source and N detectors distributed throughout space around the point source, the event count rate on each detection unit is roughly proportional to the intensity of the radiation, and inversely proportional to the square of the distance to each detector. Thus, a system of equations can be solved to identify the location of the point source. Although real-life calculations will be much more sophisticated (particularly given the distortions due to various environmental factors, possible movement of the source, its shielding, imperfect synchronization, detector imperfections, etc.), they are believed to be sufficiently close for good practical use.

Figure 4:
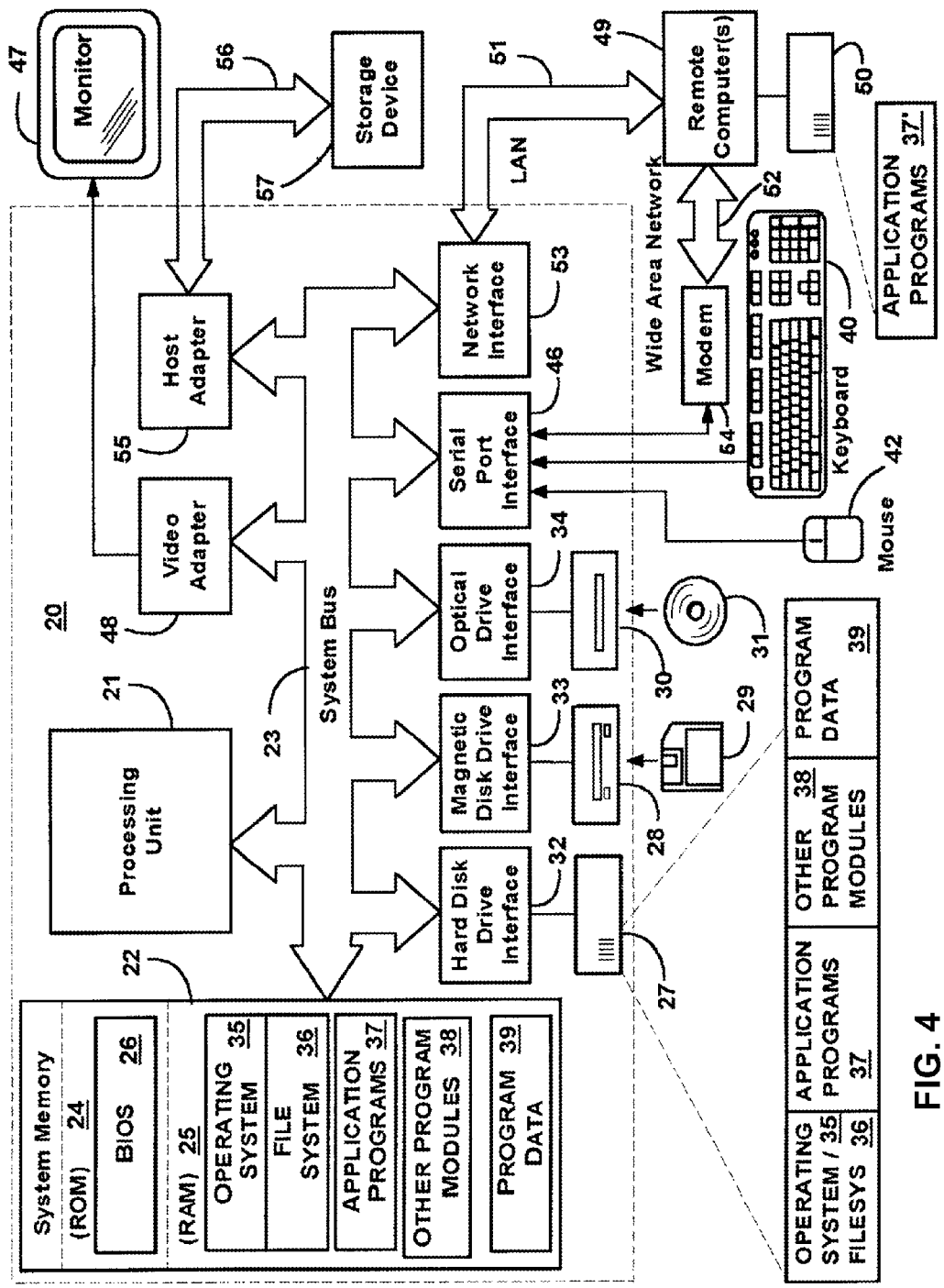
FIG. 4 illustrates an exemplary PDA or SmartPhone that can be used in the invention.

With reference to FIG. 4, an exemplary computer system (e.g., a palmtop or laptop computer, a SmartPhone, etc.), where the invention can be implemented, includes a general purpose computing device in the form of a user-side computer and/or server-side computer 302 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 302, such as during start-up, is stored in ROM 24. The computer 302 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 302. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 30200). The computer 302 includes a file system 36 associated with or included within the operating system 35, such as the Windows NT™ File System (NTFS), one or more application programs 37, other program modules 38 and program data 39. A user may enter commands and information into the computer 302 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 302 is connected to the local network 51 through a network interface or adapter 53. When used in a WAN networking environment, the computer 302 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 302, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A detection unit for detecting ionizing radiation, the detection unit comprising:
 a detection element that interacts with incoming ionizing radiation;
 a processing module that analyzes the incoming ionizing radiation detected by the detection element;
 a positioning module that determines position of the detection unit in three dimensions;
 a network interface module that receives and transmits time stamped radiation data and position information from a plurality of other detection units,
 wherein the detection unit automatically identifies other detection units that are located sufficiently close to form a cluster, the cluster being a set of detection units, data from which is processed simultaneously and collectively, and that are located sufficiently close to communicate with each other;
 radiation data integration logic that integrates the incoming radiation data, the position of the detection unit, the received radiation data from other detection units in a cluster and the received position information from other detection units, and outputs an integrated three-dimensional radiation map based on the incoming radiation data, the position of the detection unit, the received radiation data from other detection units and the received position information from other detection units; and
 a display unit that displays the integrated three-dimensional radiation map, direction to the sources of radiation in the controlled by the system zone and parameters of those sources, including any of type, speed and isotope,
 wherein the network interface module transmits the radiation data and its own position information to other detection units of a cluster to which it belongs.

2. The detection unit of claim 1, wherein the positioning module includes a Global Positioning System (GPS) receiver.

3. The detection unit of claim 1, wherein a display unit provides triangulation information for identifying direction towards a source of radiation.

4. The detection unit of claim 1, wherein the detection element is any of a Cesium Iodine (CsI(Tl)) or Sodium Iodine (NaI(Tl)) crystal, a Lithium crystal ($^6$LiI(Eu)), a scintillator sensitive to ionizing radiation, a Geiger-Muller counter, a semiconductor detector and an ionization chamber.

5. The detection unit of claim 1, wherein the networking module uses any of wireless protocols, including Wi-Fi, Wi-Max, AXCO Project 25, UWD and UMTS, or wired protocols to establish communication with other detection units.

6. The detection unit of claim 1, wherein the radiation includes neutron radiation.

7. The detection unit of claim 1, wherein the radiation includes gamma radiation.

8. The detection unit of claim 1, wherein the radiation data from other detection units includes data from different types of detectors than the detector of the detection unit.

9. The detection unit of claim 1, wherein the network module retransmits radiation data and positioning data from other detection units to at least some of the neighboring the detection units.

10. The detection unit of claim 1, wherein the detection unit is part of multiple clusters.

11. The detection unit of claim 1, wherein the cluster includes only those detection units that are within a specified radius.

12. A system for detecting radiation, the system comprising:
   a plurality of detection units forming a cluster, each detection unit including a detection element that interacts with incoming radiation, a processing module that analyzes the incoming radiation detected by the detection element, a positioning module that determines position of the detection unit in three dimensions, and a network interface module that receives radiation data and position information from a plurality of other detection units;
   wherein the detection units automatically identify other detection units that are located sufficiently close to form a cluster;
   wherein the cluster is formed dynamically as the detection units move in space; and
   each detection unit including radiation data integration logic that integrates the incoming radiation data from other detection units, the position of the detection unit, the received radiation data from other detection units and the received position information from other detection units, and outputs an integrated three-dimensional radiation map based on the incoming radiation data, the position of the detection unit, the received radiation data from other detection units and the received position information from other detection units.

13. The system of claim 12, wherein the three-dimensional radiation map is updated in real-time.

14. The system of claim 12, wherein the cluster is dynamically configured.

15. The system of claim 12, wherein the cluster size is different for at least some of the detection units.

16. The system of claim 12, wherein at least some of the detection units include a display unit that displays the integrated three-dimensional radiation map.

17. A detection unit for detecting ionizing radiation, the detection unit comprising:
   a detection element that interacts with incoming ionizing radiation;
   a processing module that analyzes the incoming ionizing radiation detected by the detection element;
   a positioning module that determines position of the detection unit in three dimensions;
   a network interface module that receives and transmits time stamped radiation data and position information from a plurality of other detection units,
   wherein the detection unit automatically identifies other detection units that are located sufficiently close from which it can receive the time stamped radiation data;
   radiation data integration logic that integrates the incoming radiation data, the position of the detection unit, the received radiation data from other detection units and the received position information from other detection units, and outputs an integrated three-dimensional radiation map based on the incoming radiation data, the position of the detection unit, the received radiation data from other detection units and the received position information from other detection units; and
   a display unit that displays the integrated three-dimensional radiation map, direction to the sources of radiation in the controlled by the system zone and parameters of those sources, including any of type, speed and isotope,
   wherein the network interface module transmits the radiation data and its own position information to other detection units.

18. A radiation detection unit comprising:
   a detection element that detects the ionizing radiation;
   a processing module that analyzes the detected ionizing radiation;
   a positioning module that determines position of the detection unit;
   a network interface module that receives time stamped radiation data and position information from a plurality of other detection units, and transmits the determined position and time stamped radiation data from the processing module to the other detection units,
   wherein the detection unit identifies other detection units that are located sufficiently close from which it can receive the time stamped radiation data;
   integration logic that integrates the detected radiation data, the position of the detection unit, the received radiation data from other detection units and the received position information from other detection units, and outputs an integrated radiation map based on the detected radiation data, the position of the detection unit, the received radiation data from other detection units and the received position information from other detection units; and
   a display that displays the integrated radiation map.

* * * * *